US012572811B2

(12) United States Patent
Deng et al.

(10) Patent No.: US 12,572,811 B2
(45) Date of Patent: Mar. 10, 2026

(54) CONTROLLABLE AND INTERPRETABLE CONTENT CONVERSION

(71) Applicant: Samsung Electronics Co., Ltd., Gyeonggi-do (KR)

(72) Inventors: Yue Deng, Mountain View, CA (US); Kawai Chen, Mountain View, CA (US); Yilin Shen, Mountain View, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1461 days.

(21) Appl. No.: 16/273,973

(22) Filed: Feb. 12, 2019

(65) Prior Publication Data

US 2020/0257962 A1      Aug. 13, 2020

(51) Int. Cl.
*G06N 3/088* (2023.01)
*G06F 18/21* (2023.01)
(Continued)

(52) U.S. Cl.
CPC .......... *G06N 3/088* (2013.01); *G06F 18/214* (2023.01); *G06F 18/2178* (2023.01);
(Continued)

(58) Field of Classification Search
CPC ............ G06N 3/044; G06N 3/08; G06N 3/02; G06N 3/088
See application file for complete search history.

(56) References Cited

U.S. PATENT DOCUMENTS 6,259,803 B1    7/2001   Wirtz
8,050,505 B2    11/2011  Hirohata
(Continued)

FOREIGN PATENT DOCUMENTS

CN        106096517 A      11/2016
KR        10-1871098 B1     6/2018

OTHER PUBLICATIONS

Liang, G., Hong, H., Xie, W., & Zheng, L. (2018). Combining convolutional neural network with recursive neural network for blood cell image classification. IEEE access, 6, 36188-36197. (Year: 2018).*
(Continued)

*Primary Examiner* — Kamran Afshar
*Assistant Examiner* — Lokesha Patel

(57) ABSTRACT

Systems and methods are described for converting input content. A first model may convert input content to an output content that exhibits one or more desired properties. A second model may determine if the conversion meets a desired quality of conversion using a discriminating function. The discriminating function may determine a difference between properties of the output content and properties of desired content, where the difference corresponds to the success of the conversion applying the desired properties. Updated control data may be generated by a third model using information from the second model, where the updated control data may be used by the first model to reduce the determined difference. After updated control data has been generated, the foregoing steps may be repeated based upon the updated control data. One of a plurality of different actions may be determined in response to the difference.

21 Claims, 12 Drawing Sheets

(51) Int. Cl.

| | |
|---|---|
| *G06F 18/214* | (2023.01) |
| *G06N 3/02* | (2006.01) |
| *G06N 3/044* | (2023.01) |
| *G06N 3/08* | (2023.01) |
| *G06V 10/44* | (2022.01) |
| *G06V 10/764* | (2022.01) |
| *G06V 10/82* | (2022.01) |
| *G06V 20/20* | (2022.01) |

(52) U.S. Cl.
CPC .............. *G06N 3/044* (2023.01); *G06N 3/08* (2013.01); *G06V 10/454* (2022.01); *G06V 10/764* (2022.01); *G06V 10/82* (2022.01); *G06V 20/20* (2022.01); *G06N 3/02* (2013.01)

(56) References Cited

U.S. PATENT DOCUMENTS

| | | | |
|---|---|---|---|
| 9,171,352 | B1 | 10/2015 | Raynaud |
| 2015/0242707 | A1 | 8/2015 | Wilf |
| 2018/0144214 | A1* | 5/2018 | Hsieh ..................... G06N 3/084 |
| 2018/0197278 | A1 | 7/2018 | Lee et al. |
| 2018/0293712 | A1 | 10/2018 | Vogels et al. |
| 2018/0357753 | A1 | 12/2018 | Lehtinen et al. |
| 2019/0042882 | A1 | 2/2019 | Kim et al. |

OTHER PUBLICATIONS

Han, X., Wu, Z., Jiang, Y. G., & Davis, L. S. (Oct. 2017). Learning fashion compatibility with bidirectional lstms. In Proceedings of the 25th ACM international conference on Multimedia (pp. 1078-1086). (Year: 2017).*

Song, Y., Li, Q., Feng, D., Zou, J. J., & Cai, W. (2016). Texture image classification with discriminative neural networks. Computational Visual Media, 2, 367-377. (Year: 2016).*

Han, S., Shen, H., Philipose, M., Agarwal, S., Wolman, A., & Krishnamurthy, A. (2016). Mcdnn: An execution framework for deep neural networks on resource-constrained devices. In Proceedings of the 14th Annual International Conference on Mobile Systems, Applications, and Services (vol. 27). (Year: 2014).*

Zhao, N., Zhang, H., Hong, R., Wang, M., & Chua, T. S. (2017). Videowhisper: Toward discriminative unsupervised video feature learning with attention-based recurrent neural networks. IEEE Transactions on Multimedia, 19(9), 2080-2092. (Year: 2017).*

Liano, K. (1996). Robust error measure for supervised neural network learning with outliers. IEEE Transactions on Neural Networks, 7(1), 246-250. (Year: 1996).*

Ouyang, X., Zhang, X., Ma, D., & Agam, G. (Aug. 2018). Generating image sequence from description with LSTM conditional GAN. In 2018 24th International Conference on Pattern Recognition (ICPR) (pp. 2456-2461). IEEE. (Year: 2018).*

Li, D., Chen, D., Shi, L., Jin, B., Goh, J., & Ng, S.-K. (Jan. 15, 2019). Mad-gan: Multivariate anomaly detection for time series data with generative Adversarial Networks. arXiv.org. https://arxiv.org/abs/1901.04997 (Year: 2019).*

Zou, H., Zhou, Y., Yang, J., Jiang, H., Xie, L., & Spanos, C. J. (May 2018). Deepsense: Device-free human activity recognition via autoencoder long-term recurrent convolutional network. In 2018 IEEE International Conference on Communications (ICC) (pp. 1-6). IEEE. (Year: 2018).*

Deng et al., Adversarial active learning for sequence labeling and generation, IJCAI'19: Proceedings of the 27th International Joint Conference on Artifical Intelligence, Jul. 2018, pp. 4012-4018.

International Search Report and Written Opinion in corresponding International Patent Application No. PCT/KR2019/013697, dated Jan. 28, 2020.

* cited by examiner

200

Receive selection of desired content
conversion
210

Convert input content to output content based
on control data
215

Determine if conversion meets a quality of
conversion
220

Quality of conversion met?
225

Yes

No

Output successfully converted
output content
230

Generate updated control data
235

Determine Action
240

400

500

505

Prediction

520
Compatibility
Vector $v_i$

Input

DVN

515

510

530

570
Hidden Layers

550

580
Output Layer

Input Layer

560

700

Convert input content again using updated control data
710

Determine if second output content meets quality of conversion
715

Meets quality of conversion?
725

Yes

No

Output successfully converted output content
730

Is conversion better than previous iteration?
735

Yes

No

Output generated notice stating conversion unsuccessful
740

CONTROLLABLE AND INTERPRETABLE CONTENT CONVERSION

TECHNICAL FIELD

This disclosure relates generally to the technical field of computer-implemented methods for converting content, such as media content. Specifically, the disclosure describes converting received content to have desired features and providing updated control data to improve the conversion when the conversion fails to meet a desired quality of conversion.

BACKGROUND

Media content conversion is a commonly desired feature in multimedia devices. That is, users wish to alter content, such as images, text, virtual reality ("VR") content, and audio to be presented with different features. For example, users may wish to cause image content to be displayed at a higher resolution, processed to remove blurring, or converted into icons (such as emojis), or may wish for audio content to be adjusted for tone or accents, or may wish to summarize textual content. Conventional content conversion tends to require specific applications that require separate training data corpuses (often containing large amounts of training data, making training a time-consuming process), thereby complicating the user's experience by requiring them to customize their own devices. Furthermore, conventional solutions tend to apply a requested conversion in a binary fashion, regardless of the quality of the conversion, and do not provide any way of improving the initial attempt to convert the content.

SUMMARY

Systems and methods are described for converting input content. A first model, which may be implemented as a neural network, for example, may convert input content to an output content to add one or more desired properties to the input content. The first neural network may have been trained to perform the conversion using finalized conversion parameters, and the conversion may further be based on control data. A second neural network in communication with the first neural network may determine if the conversion meets a desired quality of conversion based on a discriminating function applied by the second neural network to the output content. The second neural network may have been trained in a training phase to determine a difference between one or more properties of the output content and desired content, where the difference corresponds to the success of the conversion applying the one or more desired properties. Updated control data may be generated by a third neural network in communication with the first and second neural networks using information from the second neural network, where the updated control data may be used by the first model to reduce the determined difference.

A different action may be determined based on a comparison between the difference and a threshold. For example, when the conversion meets the desired quality of conversion, the output content may be provided as an output. Another action may include generating updated control data and repeating the preceding steps based upon the updated control data. The repeating may continue until the conversion fails to improve upon a previous conversion using the updated control data. Other potential actions may include providing a warning message explaining that the conversion may not meet the desired quality of conversion, and/or providing alternate options for display to the user (e.g. converting to a lesser standard, providing other enhancements, etc.).

To train the first neural network, compatible content may be converted to a training output content based on training parameters and training control data, where the compatible content is derived from a pre-defined output content having the desired properties to form a compatible pair. The second neural network may determine scores for each pair of data associated with the same training input content. The training parameters may then be updated by the third neural network to reduce a loss between the training output content and the pre-defined output content.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

Embodiments described herein utilize neural networks and critic mechanisms for content processing. Depending on the content input, various embodiments may be able to perform tasks including, but not limited to the following:

Image deblurring: Although image stabilization techniques have matured over the years, post-processing for blurry photos is still needed in case such as taking photo under low light conditions, in which the shutter of a camera is required to open for a longer period of time to allow enough light in, resulting in a blurry image even the camera movement is minimal.

Image super resolution: High resolution images/footages are in demand with the popularity of VR and 4K. Since 1080p resolution is still common, image resolution enhancement is needed in order to prevent pixilation when lower resolution images/footages are viewed on 4K TVs/VR devices.

Image style transfer: Image transferring is the process of converting a style of an image to the style of other images, while preserving its original content. A simple example would be transferring a hand-drawn image to a real photo. This technique combined with picture search engine could permit users to draw the products they are looking for and search for similar items online.

Text or language style transfer: using text recognition and/or language processing, tasks such as summarizing text or changing a language style (e.g. formal English to informal English) may be performed.

Speech style transfer: with audio content inputs, enhancements such as changing of a tone and/or an accent may be applied by various embodiments.

Regardless of the type of input, the described embodiments may provide feedback on how to improve the conversion and/or whether or not the conversion may be successfully performed.

Figure 1:
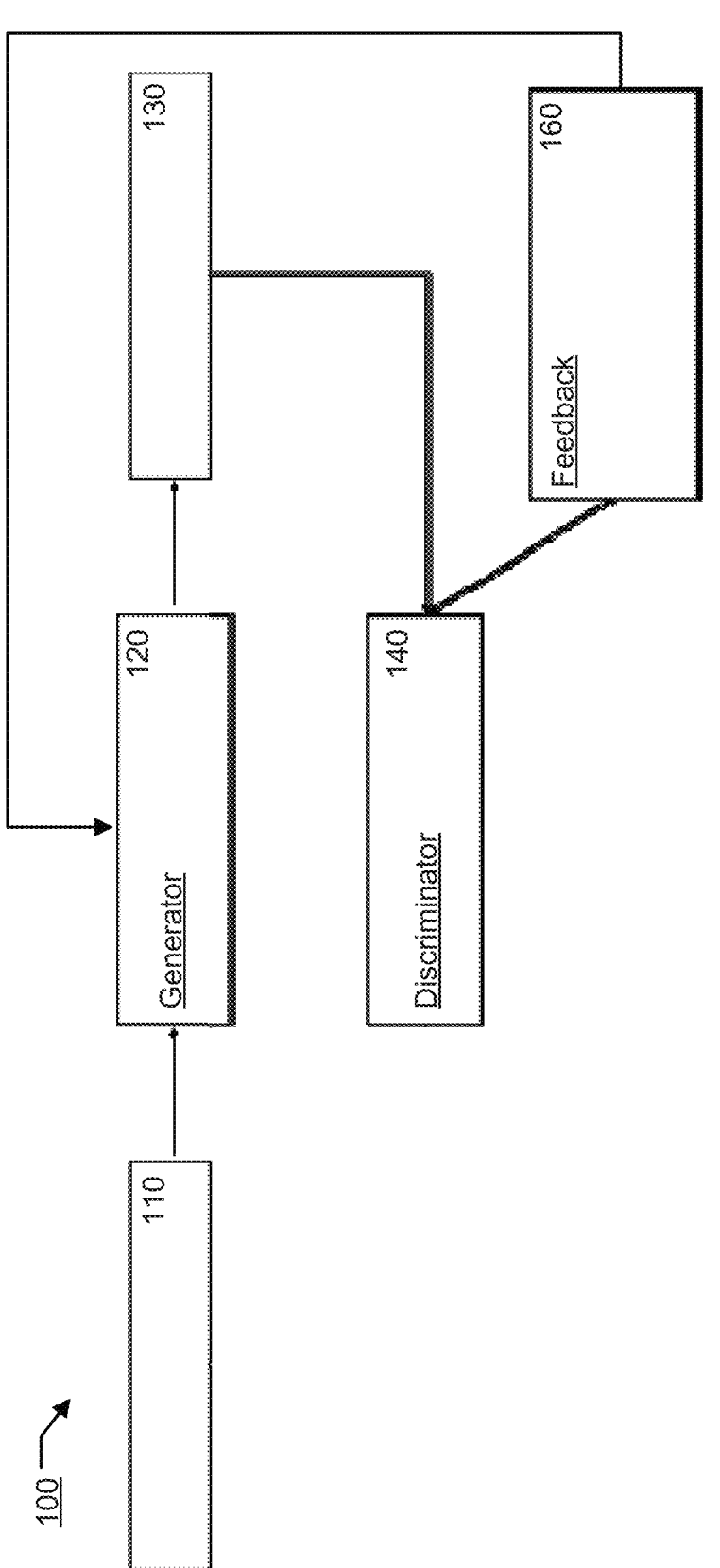
FIG. 1 shows a simplified flow diagram of a specific embodiment for a system for converting content based on control data that adapts to improve a quality of the conversion.

FIG. 1 shows a simplified flow diagram of a specific embodiment for a system 100 for converting content based on control data that adapts to improve a quality of the conversion. As shown in FIG. 1, system 100 may generally include three modules: a generator module 120, a discriminator module 140, and a feedback module 160. While an exemplary embodiment may be directed towards image enhancement/editing, as described above other types of content and other conversions of the content may also be performed using the exemplary system.

The first module, also known as the generator module 120 may be used for a variety of content conversions and may be implemented as a neural network, such as a convolutional neural network, or any other suitable network. As mentioned above, in some embodiments the content conversions may include one or more of: 1) converting a low-resolution image to a high-resolution image; 2) converting a blurred image to an unblurred image; 3) converting an image in style A to style B; 4) converting a whole paragraph of text descriptions to a short text summary; and 5) converting VR content to Stylish VR content. The foregoing list of conversions is not meant to be limiting as those of skill in the art will appreciate that other conversions may be performed utilizing generator module 120. The input 110 of the neural network may be the original content and the output 130 may be the converted content with the desired transformation.

The second module, also known as the discriminator module 140 may also be implemented as a neural network (or any other suitable network), and may determine if the conversion performed by the generator module 120 meets a desired quality of conversion. The discriminator module 140 receives the output content 130 (returned by the generator module 120) as input and may output a difference that assesses the quality of the output content 130. The operation of the discriminator module 140 is explained in greater detail below.

A third module, also referred to herein as the feedback module 160 may be a neural network (or any other suitable network) that extracts information about the features of the output content from the discriminator module 140 and adapts the control data based on the extracted information until the conversion meets a desired quality of conversion. The feedback module 160 may also generate a notification such as a natural language message telling users whether the desired task is achievable or not in some embodiments. For example, in the case of image style transfer, if the output image does not appear to be a natural image based on the score output by the discriminator 140, the feedback module 160 can provide a warning message. The message output by the feedback module 160 can be a sentence, a selection choice for the user, a speech and/or other indication information.

The three modules of the system 100 work together to convert content based on control data that adapts to improve a quality of the conversion. The generator module 120 may produce enhanced content, with the goal of producing output content such that the discriminator module 140 is not able to distinguish the converted output content having the desired enhancement from ground truth training samples, which were used to train the system 100.

Figure 2:
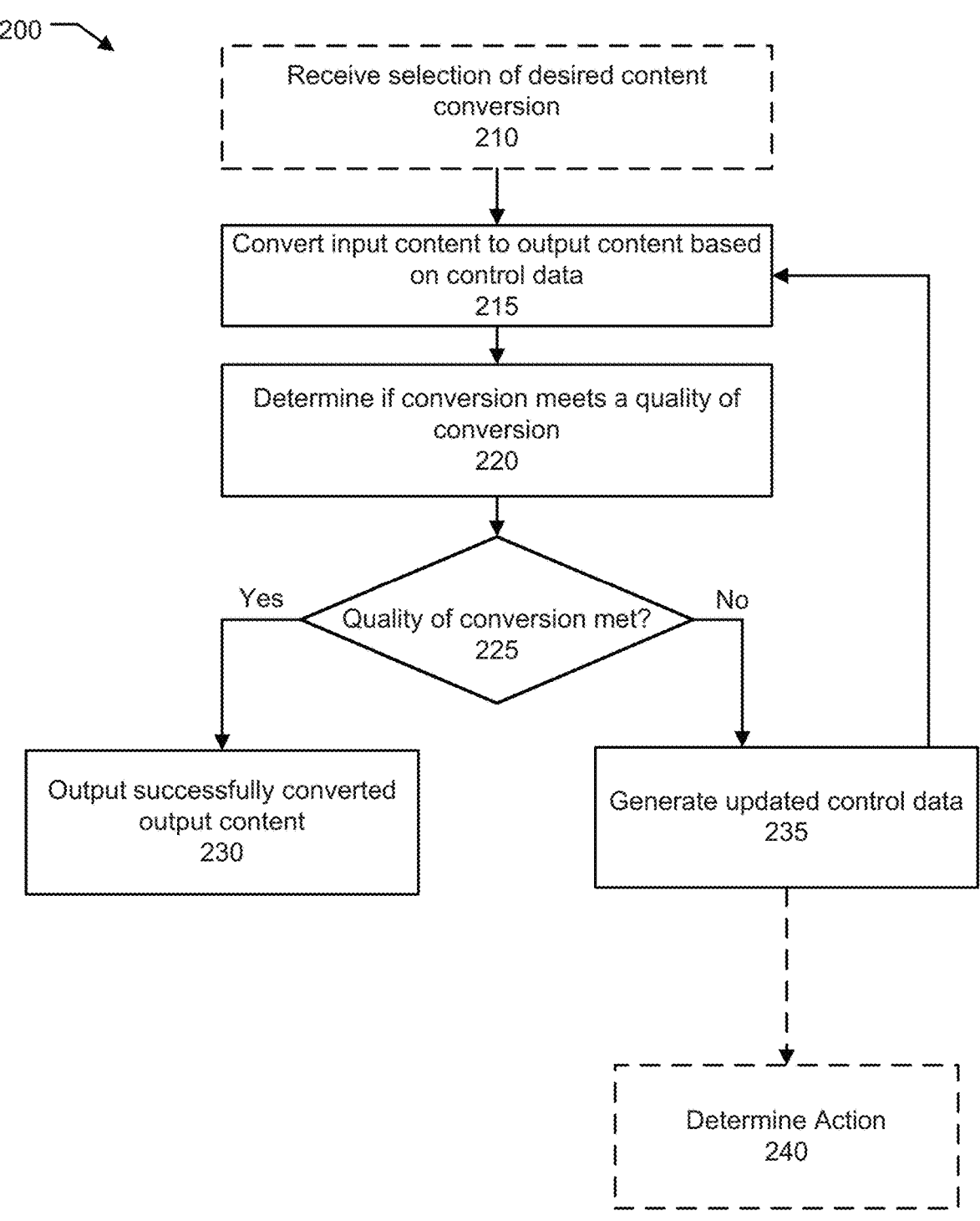
FIG. 2 shows a specific embodiment of a flow diagram for a method of converting content based on control data that adapts to improve a quality of the conversion.

The feedback module 160 may receive the output of the discriminator module 140, including the generated score and features of the output content used to generate the score. When the score is lower than a predetermined threshold, feedback module 160 may output information as feedback and update control data based on the information so that the generator module may accordingly convert output content that has a higher score than output content resulting from a previous conversion. Also, system 100 may operate differently when the system 100 is being trained. During the training of system 100, the parameters of the neural networks used in the generator, discriminator and/or feedback modules may be determined based on training data that includes compatible and incompatible pairs. FIG. 2 and the accompanying text detail the operation of system 100 during runtime, while FIG. 9 and its accompanying text describe the training of system 100 in greater detail.

FIG. 2 shows a specific embodiment of a flow diagram for a method 200 of converting content based on control data that adapts to improve a quality of the conversion during a prediction phase. Method 200 may begin with the optional step 210 of receiving a selection of a conversion from a plurality of conversions to be applied to the input content, each conversion changing the presentation of the input content to include certain desired properties. While for some content, the conversion may be automatically selected by the system 100 based on the type of input (e.g., receiving virtual reality content as an input, and automatically selecting to convert the input to stylish virtual reality content), other content types (such as images, text, or audio content) may have multiple conversion options to select from.

At step 215, a first neural network, which may be the generator module 120 of FIG. 1, may convert the received input content to an output content, having certain desired properties, based on control data and the input content. The control data may be set to zero on the first conversion of the input content and may be subsequently modified by the feedback module to improve the quality of the conversion, as is described below. The first neural network may be previously trained to convert content to output content using parameters finalized during a training phase. In an exemplary embodiment, the first neural network may be implemented as a convolutional neural network, where the input of the neural network is a low-quality image and the output is the high-quality image. The desired properties may be according to a conversion category of the received input, where the categories include: a selected conversion by a user, a default conversion based on configuration of the first neural network during training, or a conversion based on the user's use pattern for a type of content received as input.

At step 220, a quality of the conversion may be determined by a second neural network, which may be the discriminator module 140 of FIG. 1 in communication with the first neural network. In some embodiments, the second neural network may apply a discriminating function to the output content, which predicts a difference between the output content and desired content based upon the finalized parameters of the previously-trained second neural network. The desired content of method 200 refers to a hypothetical content having the desired properties of the conversion (e.g., a version of an input image having the desired higher resolution and/or having deblurring processing applied, a version of audio content with a desired tonal/accent enhancement, etc). While, unlike during training, there is no ground truth image to compare during method 200, the parameters of the second neural network are well-trained and may be used to make accurate predictions of what features the input content should have post-conversion. The determined difference may be compared to differences stored during the training phase to assess the quality of the conversion (since the differences stored by the second neural network have known quality with respect to the desired quality of conversion).

In an exemplary embodiment, the discriminating function may generate a score for the conversion based on the predicted difference, and the desired quality of conversion may be a threshold score. The discriminating function performed by second neural network may output a score for the conversion based on matching the identified features of the output content being similar to features of desired content.

In another embodiment, the discriminating function may generate hidden layer values for various differences between the output content and the desired content. The differences may be arranged as a difference vector, where each value is associated with various properties of the conversion (e.g., for image data, values may be included for color and/or shape, for voice data, values may be Mel-frequency cepstrum coefficients, etc.).

At step 225, the second neural network determines if the desired quality of conversion (e.g. a threshold score, or difference) is met. When the desired quality of conversion is met, the conversion is deemed successful by the discriminator module 140 and the output content is returned at step 230. However, when the quality of conversion is not met, the conversion is not successful.

At step 235, a third neural network in communication with the first and second neural networks generates updated control data using information from the second neural network, where the control data may be used by the first neural network to generate improved output content. The third neural network may be the feedback module 160 of FIG. 1. The control data may be updated based on the identified features of the output content from the second neural network. To generate the updated control data, the third neural network may be trained to modify control data in response to identified features. The third neural network may then provide the updated control data back to the first neural network at step 235, which may convert the input data again using the updated control data. The first neural network may then output a second output content, and the discriminator module may assess the quality of the conversion for this second output content by repeating steps 220 and 225, and the repeating may continue until either a) the conversion meets the desired quality of conversion, or b) the conversion fails to improve upon a previous conversion using the updated control data. This may result in improved conversion, and the second output content may be output when the conversion associated with the second output content meets the desired quality of conversion.

The features identified by the second neural network may also be used to determine an action by the third neural network when the conversion fails to improve upon a previous conversion at optional step 240. After the first, or even subsequent iterations of method 200 on a received input content, the first neural network may be unable to convert the input content to the desired quality. In such cases, the action of step 240 may include generating a natural language message when the predicted difference does not meet the threshold and causing the generated message to be presented to the user (e.g., displayed on a display, output via a speaker, etc.). The action may also include repeating the conversion process using the updated control data, outputting the output content, or suggesting alternative options to a user via a displayed user interface. In addition to determining the action when the conversion fails to substantially improve on a previous conversion, the action may also be determined based on system resource limitations (e.g. computational or memory limitations that have been pre-determined and would be exceeded by further conversion). In some embodiments, step 240 may optionally follow step 230 to indicate a successful conversion, with or without further conversion details.

Figure 3:
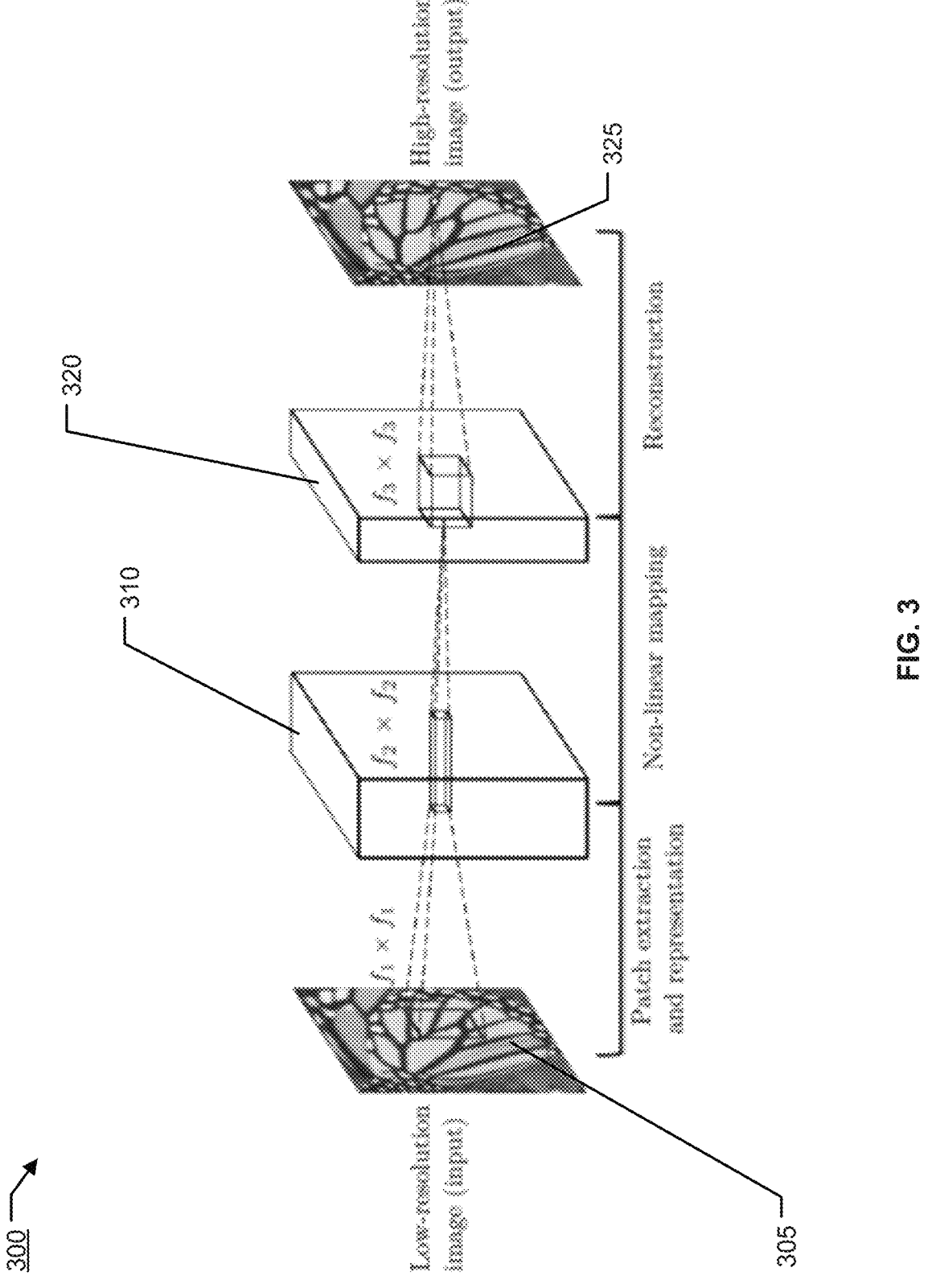
FIG. 3 shows a block diagram of a specific embodiment of a neural network being used to apply a user-requested content conversion.

FIG. 3 shows a block diagram of a specific embodiment of a convolutional neural network 300 being used to apply a user-requested content conversion by the generator module 120. A low-resolution image 305 may be received as an input to the first neural network. The first convolutional layer 310 may extract a set of feature maps using function $f_1$, whose parameters were set in the training phase. The second layer 320 may map the extracted feature maps nonlinearly to high-resolution patch representations using function $f_2$. The third layer 325 may combine the predicted patch representations with a spatial neighborhood from the input image to produce the final high-resolution image (also shown at 325).

A configured convolutional neural network can provide a variety of content conversions. In performing these conversions, different sets of compatible and incompatible training data pairs may be used as inputs during the training phase. These different training objectives (i.e., different conversions) lead to different parameters that may be configured and stored into the convolutional neural network, so it can accomplish each type of conversion. This will be explained further below, in the text accompanying FIGS. 8 and 9.

Figure 4:
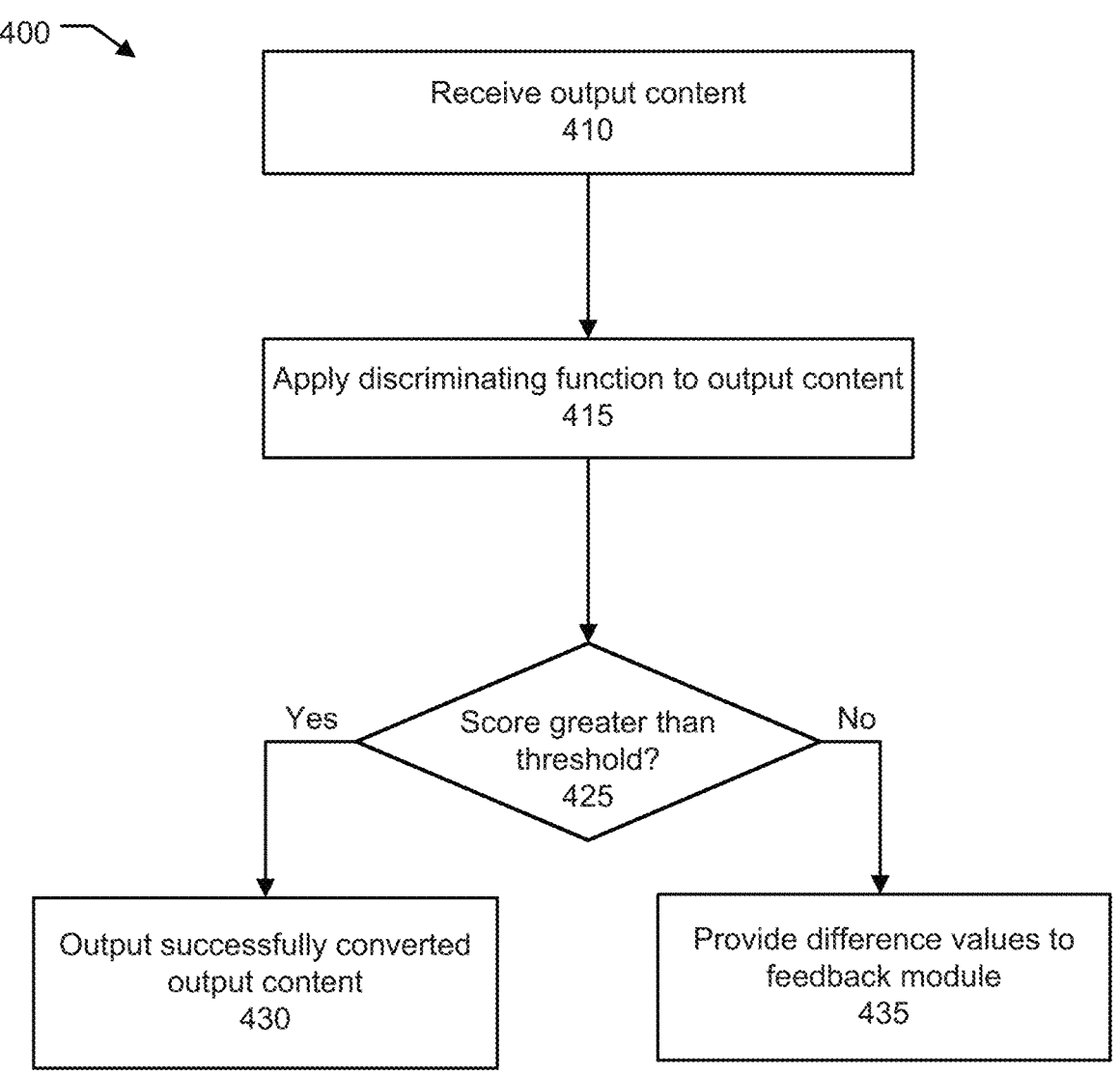
FIG. 4 shows a specific embodiment of a flow diagram for a method of comparing output of a generator module to a desired quality of conversion.

FIG. 4 shows a specific embodiment of a flow diagram for a method 400 of processing the output of a generator module 120 to determine the quality of the conversion. Method 400 may be viewed as a more detailed description of an embodiment of steps 220 and 225 of FIG. 2, and detailed operation of the discriminator module 140, according to various embodiments.

The discriminator module 140, as described above, determines whether the generated content of the generator module 120 satisfies the desired property of the conversion. For instance, when super-resolution for an image is the selected transformation, the discriminator can determine whether the output image satisfies certain super-resolution qualities. To do so, the output content is received at step 410 by the second neural network (e.g. the discriminator module 140). At step 415, the discriminating function may be applied to the output content, where the discriminating module has been trained to evaluate the quality of the output content using parameters that are set during training similarly to the generator module 120. The evaluated quality may be determined as a predicted difference vector between the output content and desired content, as described above. Also, in some embodiments, the discriminating function may output a score indicative of how well the conversion meets the desired quality of conversion. For example, the score may be determined using a hidden layer of the discriminator module 140 to convert the difference vector to the score.

The desired quality of conversion may be a predetermined threshold indicating that the conversion is acceptable. When the score is greater than the threshold at step 425, the output content is output at step 430 and the conversion was successful. When the score is less than the threshold at step 425, the difference values discussed above may be used by the feedback module at step 435 to generate updated control data.

Figures 5A, 5B:
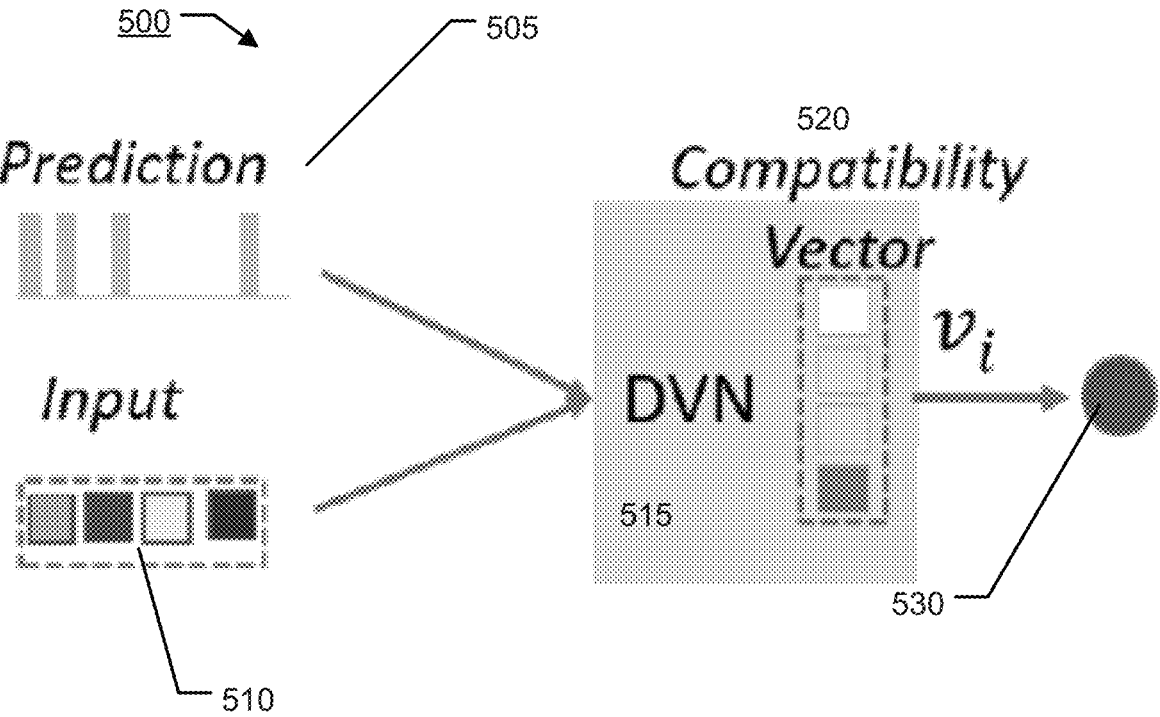
FIGS. 5A and 5B show block diagrams of specific embodiments of neural network architectures for comparing output of the generator module to the desired quality of conversion based on features of the output content.

FIGS. 5A and 5B show block diagrams of specific embodiments 500 and 550 of neural network architectures for processing output of the generator module 120 to determine quality of the conversion. FIG. 5A shows a flow of a discriminator module, here implemented as a discriminative value neural network (DVN) 515 processing generated output content 510 with prediction 505, which includes the desired enhancement (e.g., for image input content, super-resolution, de-blurring processing, a photograph of a hand-drawn input, etc). The predicted difference 520, taking the form of a compatibility vector, is determined, and the difference 520 is used to determine score 530 of the conversion.

Diagram 550 shows an exemplary embodiment of the DVN 515, including a plurality of nodes, and three layers. The input layer 560 corresponds to inputs into the DVN 515, and processing takes place in the hidden layers 570. Each node may be used for feature detection, for example, in the input layer based on parameters set during the training of the discriminator module 140. The hidden layers 570 may be used to generate values by mapping (e.g., using nonlinear mapping or a linear product), for example, extracted features from the output content to the features of desired content to obtain a predicted difference vector, which may be subsequently used in generating feedback (as is discussed below). Values from the hidden layers 570 may be used to generate the value for the output layer, which may be the score associated with the quality of the conversion.

Figure 6:
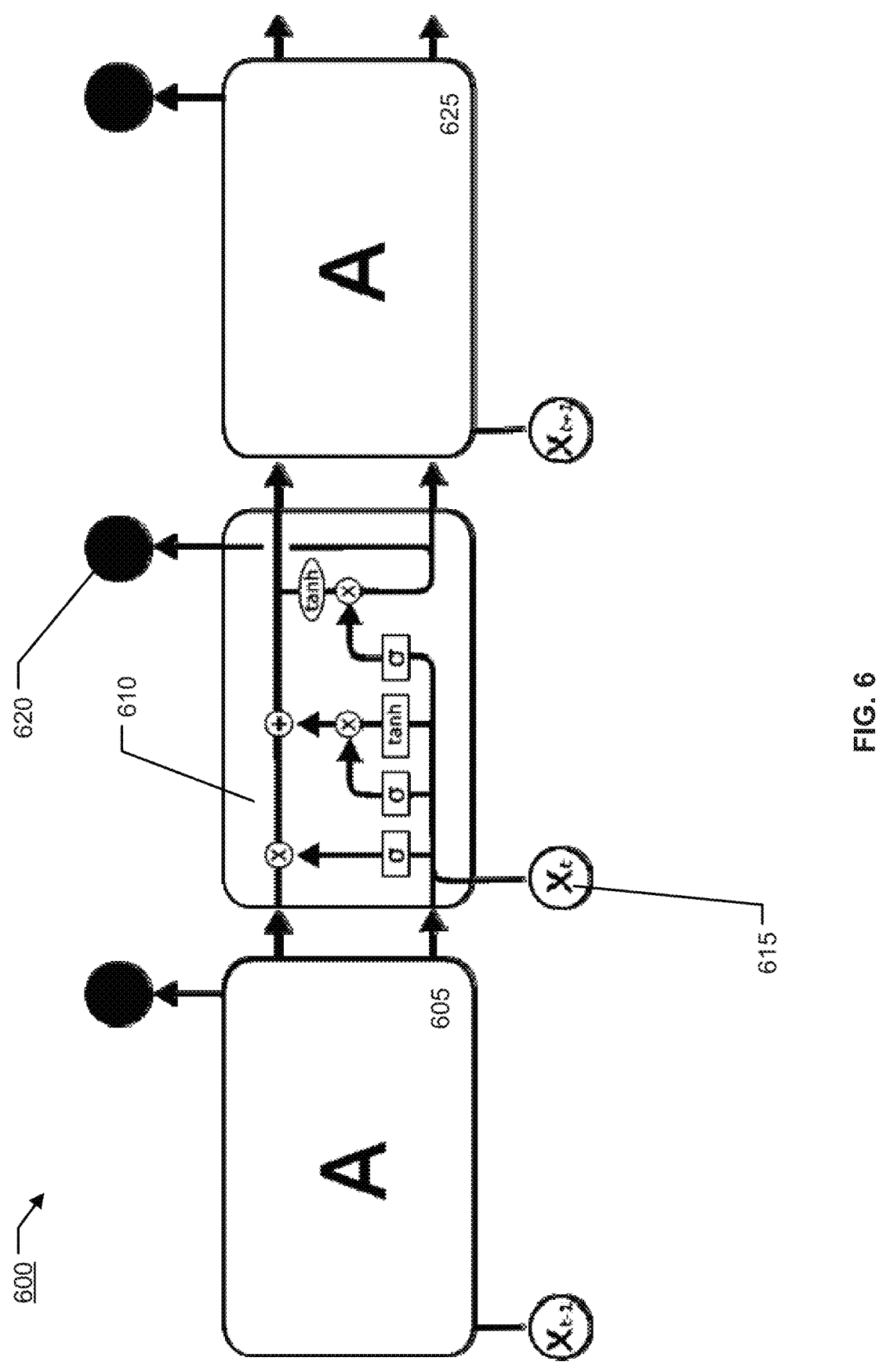
FIG. 6 shows a block diagram of a specific embodiment of a neural network being used to provide updated control data based on the hidden layer values of a discriminator module.

FIG. 6 shows a block diagram of a specific embodiment of a neural network 600 being used to provide feedback on a conversion to the generator module based on the hidden layer values of a discriminator module 140. The feedback module 160, which may be implemented as a third neural network 600, or may be integrated with the discriminator module 140 as part of a second neural network. In addition to generating the updated control data as described above, the feedback module 160 may also inform the user the quality of the conversion and may offer users other options with the current conversion. The feedback module 160 may receive the predicted difference, which may include a plurality of values from the hidden layer of the discriminator module 140, and then convert the hidden values into interpretable results for users. An encoder-decoder structure may be used to translate hidden values into information interpretable by end users (such as a message for display to the user). The encoder may be designed to transform the hidden score/information of the discriminator as latent representations. The encoder and decoder steps may be implemented by a multilayer fully connect neural network, such as neural network 600, including long short-term memory (LSTM) modules.

A LSTM module, such as module 610, may use "remembered" past data from previous node 605 as an input, along with the current difference 615 associated with the output content. Four processing layers are shown within LSTM module 610, which may serve as gates to filter the received difference 615 (which may be a difference vector) using a combination various functions and the received past data. LSTM module 610 may output the information regarding why the output content conversion was unsuccessful. For example, the predicted difference vector may include information about the conversion of an image with regard to various specific properties, such as color and shape. This information may be extracted from the difference vector by the LSTM module 610 and be used to provide feedback to a user regarding why the conversion was unsuccessful.

The encoder and decoder module included in the feedback module 160 may convert hidden information in the predicted difference vector to an explicit human understandable indication in some embodiments. The indication may take the form of a natural language sentence and may merely describe the extracted information from the hidden layer of the discriminator module 140 or may provide additional options. These additional options may include allowing a user to select from other alterations that are available. For instance, the feedback module can automatically output a sentence composed of multiple words like "The TV can only convert your inputted video into the resolution of 2K [rather than the requested 4K]. Would you like me to play in this resolution?" or "We successfully helped you lighten your face, and do you like me to enhance the contrast?"

The decoder in this feedback module may attempt to output each word sequentially. In detail, the feedback module may sequentially decode a "word" x(t)$ in a way that x(t)=LSTM(h(t−1),x(t−1)), where $h(t−1)$ and $x(−1)$ are the learned hidden state and the predicted word from the previous node. The latent vector obtained from the encoders may be used as the first hidden $h(0)$ to start the whole decoding process. Many existing LSTM decoder structures can be used here including, the original LSTM and its attention-based extension. The training or warm start of this feedback module 160 may utilize some human provided annotation data. Important information from the processing layers may be persisted and forwarded to the next node 625 for processing future output content.

Figure 7:
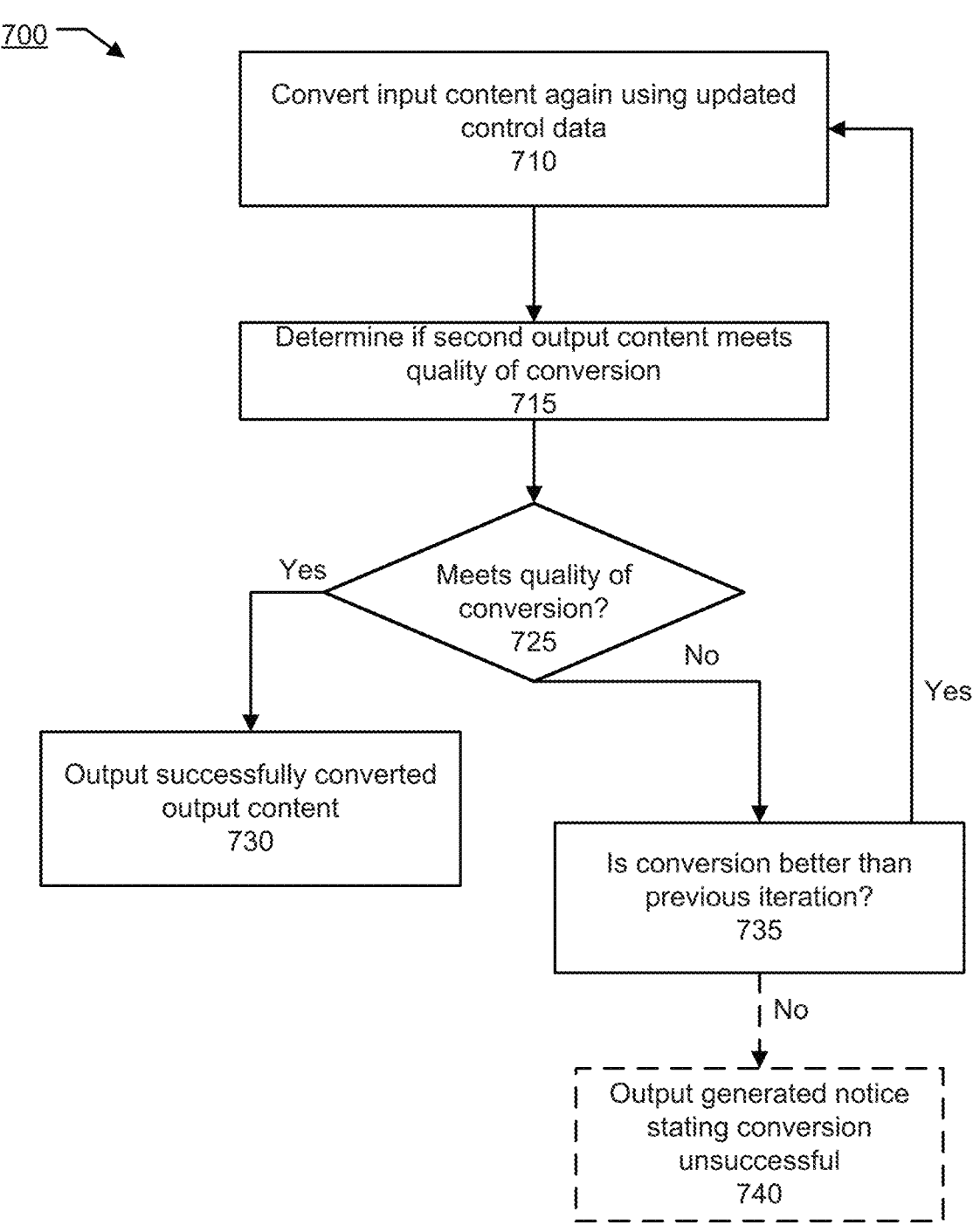
FIG. 7 shows a specific embodiment of a flow diagram for a method of using updated control data to modify a requested content conversion.

As discussed above, the feedback module 160 may use the predicted difference determined by the discriminator module 140 to update control data, which may be fed back to the generator module 120 to improve the conversion process. FIG. 7 shows a specific embodiment of a flow diagram for a method 700 of using feedback to modify a requested content conversion. Method 700 may be viewed as a more detailed description of an embodiment of the optional iterative process described that may occur starting at step 235, and detailed operation of the feedback module 160, according to various embodiments.

As stated above, the feedback module 160 may provide the updated control data back to the first neural network of the generator module 120, and the generator module 120 may convert the input content using the updated control data into a second output content at step 715. The discriminator module 140 may assess the quality of the conversion for this second output content at step 715. This may result in improved conversion, and the third output content may be output at step 730 when the conversion meets the desired quality of conversion at step 725. Alternatively, when the conversion still fails to meet the desired quality of conversion, the feedback module 160 may determine if the conversion is better than the previous iteration. If so, then convergence has not yet occurred, and the method 700 is repeated until the desired quality of conversion is met or the conversion is no better than the previous iteration (i.e. there is convergence). When convergence has occurred, the predictions have improved to their logical limit, and output information may be generated at step 740 stating that the conversion is unsuccessful.

In order to train the modules of system 100, compatible training content pairs and incompatible training content pairs may be used. The compatible training content pairs may be sample content that does not have a desired property paired with its ground truth content exhibiting the desired property. Such compatible pairs can be easily obtained from simulated data. For instance, in the super resolution task, a 4K resolution image may be used as the high-quality image, and the 4K image may be down-sampled to obtain a low resolution image to form a compatible pair with the original 4K image. In the deblur conversion example, a sharp image may be manually blurred with an algorithm to create a compatible pair. In some embodiments, a compatible pair may include training input content that is not identical to the ground truth content. In such embodiments, the pair may still be compatible, because the conversion may be focused on the one or more properties of the content involved in the conversion (and not, for example, what is depicted in the images, or if the audio content comprises different spoken words).

After accumulating these compatible samples, the discriminator module 140 may be trained to identify a quality of conversions by the generator module, using a scoring scale where the highest score (e.g., 1) is assigned to the compatible training content pairs, and the lowest score (e.g., 0) may be assigned to incompatible training content pairs. The incompatible training content pairs may be created by associating first content with different second content that does not have the desired property in an exemplary embodiment. In other embodiments, the different second content of an incompatible pair may be generated during training by using the output of the generator module 120 when the generator module's parameters have not been finalized. To estimate the compatibility score of any given training output, a true compatible score (representing 100% compatibility, for example) is assigned/obtained based on some similarity calculations between properties of the desired and generated output. Then, the difference vector, obtained from the last hidden layer of the discriminator module 140, is regressed to the calculated score. The regression may be performed, for example, by converting the difference vector to a scalar value using the dense connection layer of the discriminator module 140.

Figure 8:
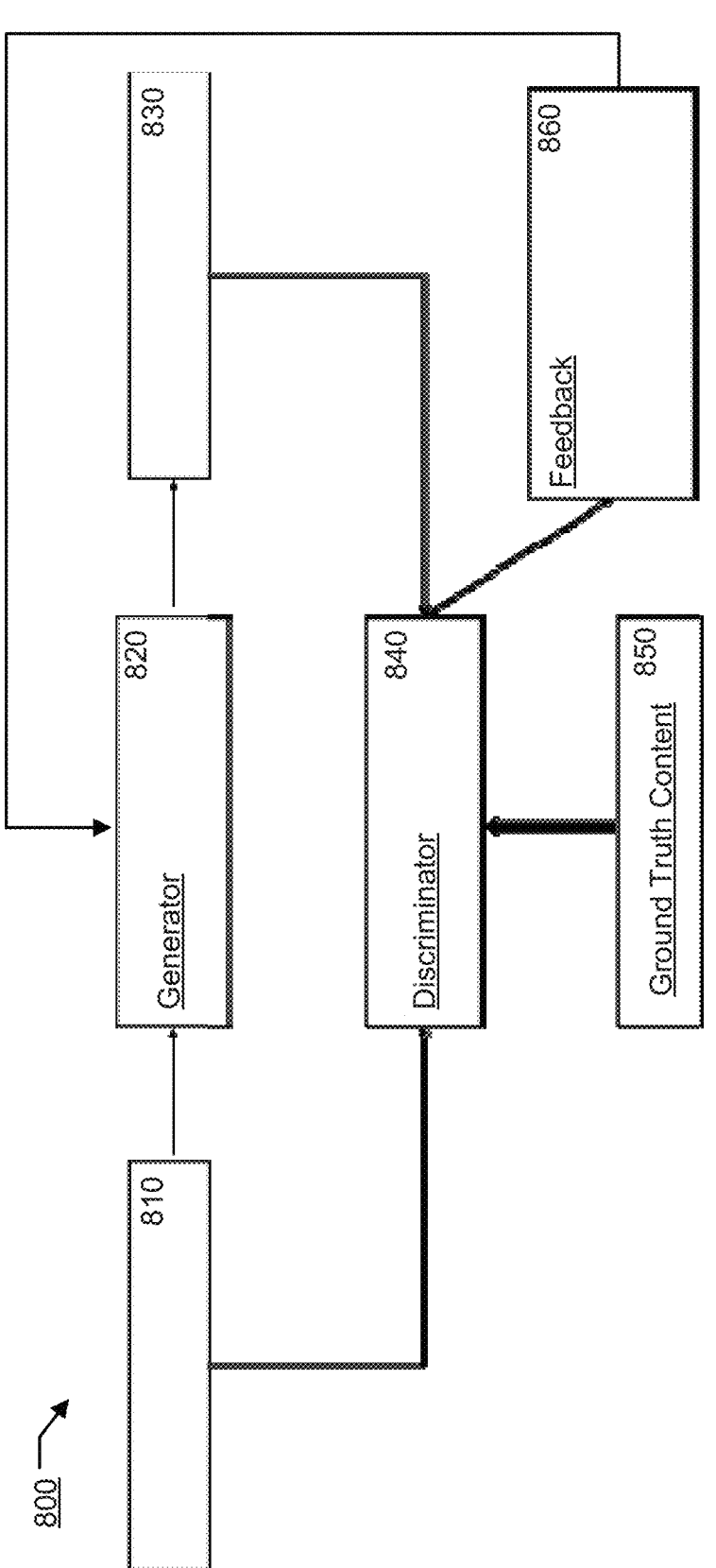
FIG. 8 shows a simplified flow diagram of a specific embodiment for training a system for converting content based on training data that includes compatible content pairs.
Figure 9:
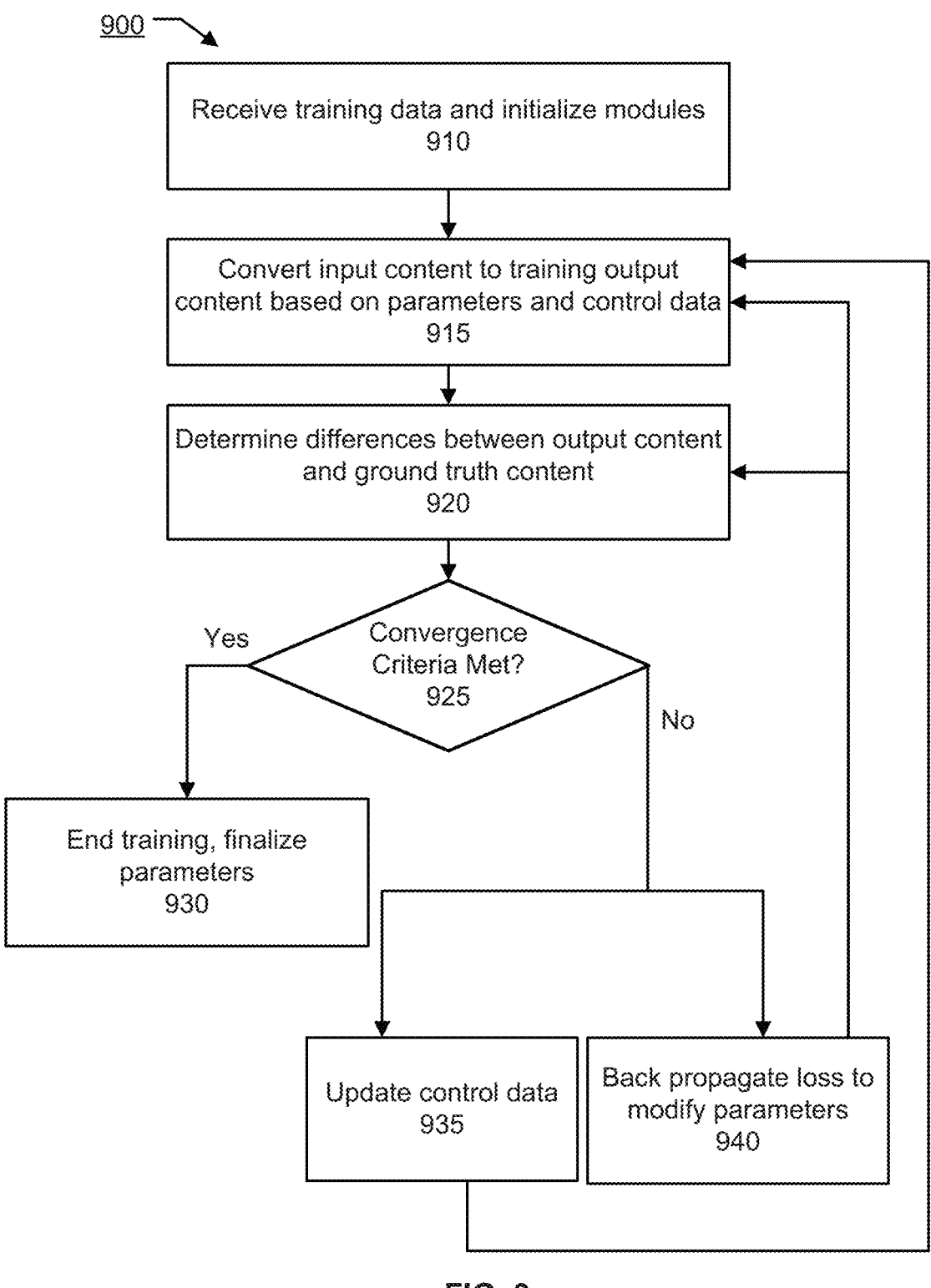
FIG. 9 shows a specific embodiment of a flow diagram for a method of training the system for converting content based on control data that adapts to improve a quality of the conversion.

FIG. 8 shows a simplified flow diagram of a specific embodiment for training a system 800 for converting content based on training data that includes compatible content pairs. As in FIG. 1, system 800 includes generator module 820, discriminator module 840, and feedback module 860. FIG. 9 shows an exemplary embodiment of a flow diagram for a method 900 of training the system that provides updated control data to improve the conversion when the conversion fails to meet a desired quality of conversion. At step 910, the training data, including a minibatch of m samples and their labels (X,Y) are input to the system, where X and Y represent, using the super-resolution example, low-resolution content, and ground truth content 850 having the desired high-resolution feature. Different conversions may have different training data; for example, for a resolution increasing conversion, X may be a down-sampled version of high-resolution image Y, while for a deblurring conversion, X may be a blurred version of Y. Step 910 may include initializing the generator module 820 and the discriminator module 840 by any convolutional neural network and deep neural network training strategies. In embodiments where the ground truth content 850 includes multiple enhancements, the initializing may include identifying a dominant enhancement, or receiving user input clarifying which enhancement is desired by the user for the generator module 820.

At step 915, the input content (X) 810 from each compatible pair is converted to a training output content (Z) 830 (i.e., a prediction) via generator module 820 using training parameters and training control data. The training control data acts as another input for the generator module 820 and may be set to zero (or a random value) on the first run of the training method 900 in various embodiments. The training parameters may control the behavior of the generator module 820 during content conversion and may start with default values on the first run of method 900. By repeating method 900, a loss of the generator module 820 may be minimized by the discriminator module 840 (alone or together with the feedback module 860) to make the predictions Z for each input content X match the ground truth Y, and the generator module neural network's parameters (and also control data) may be updated accordingly.

At step 920, both (X,Y) and (X,Z) are input into the discriminator module 840 to determine differences between the output content Z 830 and the ground truth content Y 850. The input content 810 for the compatible and incompatible pairs is also received by the discriminator module 840, as all three are used to train the discriminator function of the discriminator module 840 (e.g., for setting the scoring function). The cross-entropy loss for the discriminator module 840 may be minimized to regress to score one (highest score) for the compatible (X,Y) pairs and zero (lowest score) for incompatible (X,Z) pairs, respectively, in some embodiments. As stated above, incompatible pairs may be obtained in a variety of ways, also including matching a desired output content $Y_1$ from a compatible pair $(X_1,Y_1)$ to the input content $X_2$ from a different compatible pair $(X_2,Y_2)$.

Using the compatible and incompatible training content pairs may advantageously reduce the amount of training needed for each neural network compared to conventional approaches, as only two pairs of training data are needed in some embodiments (as opposed to a training corpus of hundreds of data points, for example), as the iterative nature of the training process results in a range of scores being generated by the discriminator module 840 for a plurality of training output content, where each score may be associated with a different set of features exhibited by the plurality of training output content. Convergence of the individual neural networks may also be reached faster when the compatible and incompatible training content pairs are used, due to the continual improvement in the parameters of the neural networks for each iteration.

At step 925, the hidden layer feature values of the discriminator module 840 may be provided to the feedback module 860. If convergence criteria (i.e., criteria showing that substantially no further improvement is being achieved) is met at step 925, training ends at step 930 and parameters for the generator module 820, discriminator module 840 and feedback module 860 may be finalized. Otherwise, the feedback module 860 may update the training control data based on the discriminating step hidden layer outputs at step 935, as is done in the prediction phase described previously.

By identifying particular problems with the conversion based on the hidden values of the discriminator module 840, the feedback module 860 may provide appropriate correction in the processing of the generator module 820 and/or the discriminator module 840. The loss of this step may be back-propagated to the generator module 820 and discriminator module 840 to update their training parameters, in addition to the control data, accordingly at step 940, and the method 900 may be repeated from step 915 on until convergence takes place. The back propagation may be performed using a gradient, for example. The feedback module 860 may also, in embodiments where a message is provided to the user, minimize the vector-to-sequence losses to encourage the LSTM outputs to the right sentence explaining the current situation. In the training phase, the ground truth explanation sentences used to provide the correct natural language response to the user are pre-defined.

In addition to the foregoing, other features may be added to provide further benefits to the described systems and/or methods. For example, the generator module 120 may recognize a user's intent based on the type of received input content and perform an alteration of the input content without receiving a command from the user. Also, the discriminator module 140 may factor system resources in real-time in determining whether or not a conversion is feasible. For example, if the discriminator module 140 determines that conversion of an image to 8K resolution may be too time-consuming and have too much latency for good performance, the discriminator module 140 may downgrade a determined score for the conversion.

In additional embodiments, based on user profiling, an end-user may be grouped into a certain group by machine learning algorithms of feedback module 160. The group information may then be used as an auxiliary input into the generator module 120 (similarly to the control data). The generator module 120 may subsequently know what the end-user's preferences are (from the group label vector) and can modify the output accordingly (e.g. the group feature vector indicates that the user like sports, therefore certain features of the output may be modified accordingly) for the specific user.

Figure 10:
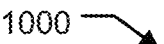
FIG. 10 shows another specific embodiment of a flow diagram for a method of converting content based on control data that adapts to improve a quality of the conversion.
Figure 10:
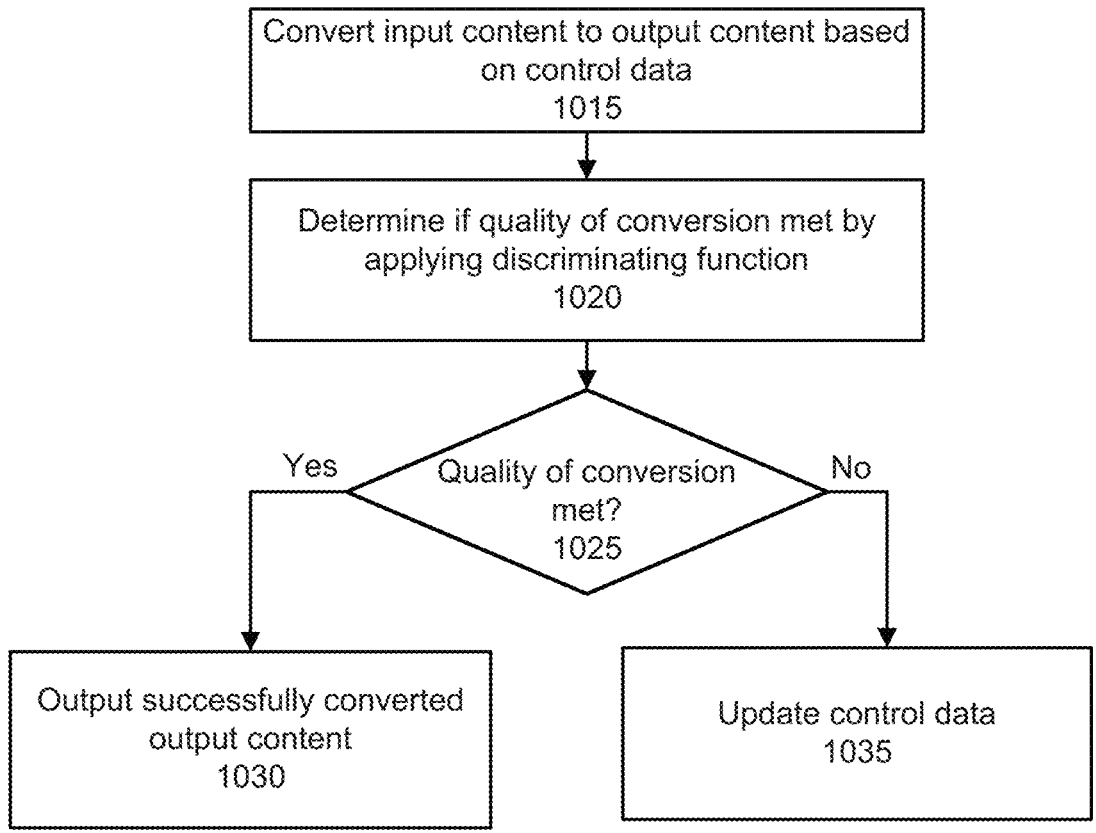

FIG. 10 shows a specific embodiment of a flow diagram for an alternative method 1000 of providing feedback in response to a user-requested content conversion during a prediction phase. At step 1015, a first neural network may convert the received input content to an output content based on control data input to the first neural network, which may be the generator module 120. The first neural network may have been trained to convert content to a desired content based on fixed parameters from the training phase. The generator module 120/first neural network converts the input image/content to another image or content that exhibits certain desired properties.

At step 1020, a quality of the conversion may be determined by a second neural network, which may be the discriminator module 140, in communication with the first neural network. To do so, the second neural network may apply the discriminating function to the output content to see if the conversion meets a desired quality of conversion. In determining the quality of the conversion, various features of the output content may be extracted by the second neural network.

When the conversion meets the desired quality of conversion at step 1025, the conversion is deemed successful by the discriminator module 140 and the output content is returned at step 1030. However, when the conversion does not meet the desired quality of conversion at step 1025, the conversion is not successful. A third neural network, which may be the feedback module 160, generates updated control data based on the extracted features of the output content at step 1035, and the updated control data may be output by the third neural network.

Figure 11:
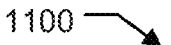
FIG. 11 shows another specific embodiment of a flow diagram for a method of training the system for converting content.
Figure 11:
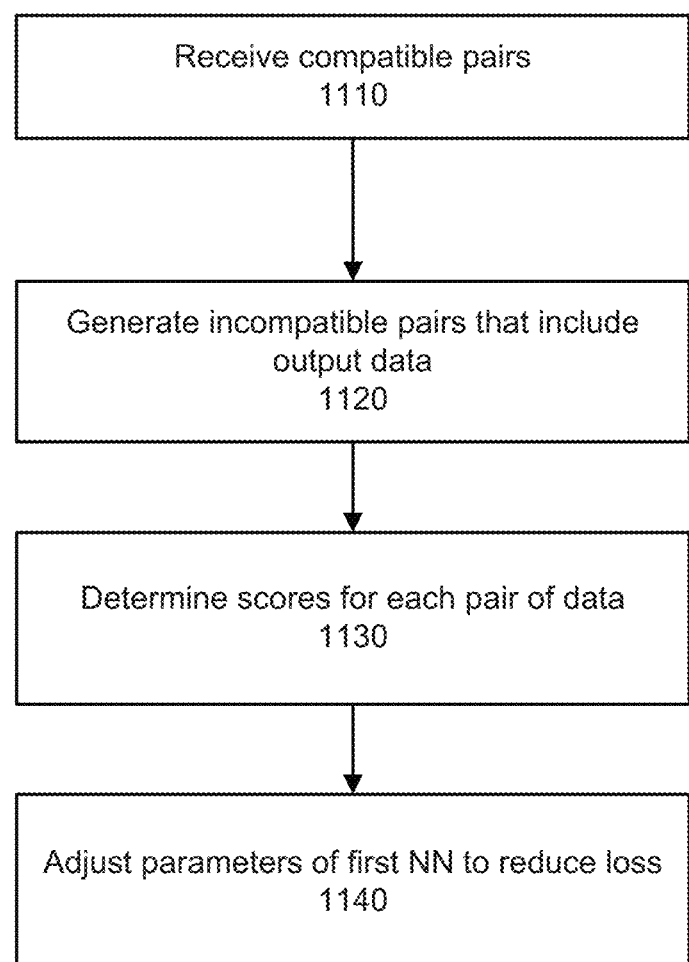

FIG. 11 shows another specific embodiment of a flow diagram for a method 1100 of training the system for converting content. At step 1110, a first neural network (NN) may receive a plurality of pairs of compatible data, each compatible pair including a training input content and pre-defined output content with desired properties as described above. At step 1120 the first NN may generate a plurality of pairs of incompatible data, each pair of incompatible data including training input content from a compatible pair and generated training output content after an attempted first conversion. At step 1130, scores may be assigned (by a second NN, for example) for each pair of data. This may include, for example, assigning a score of 1 for a compatible pair, and a score of 0 for the incompatible pair. At step 1140, parameters of the first NN may be adjusted as described above to reduce a loss between the training output content and the pre-defined output content for each pair of data.

Figure 12:
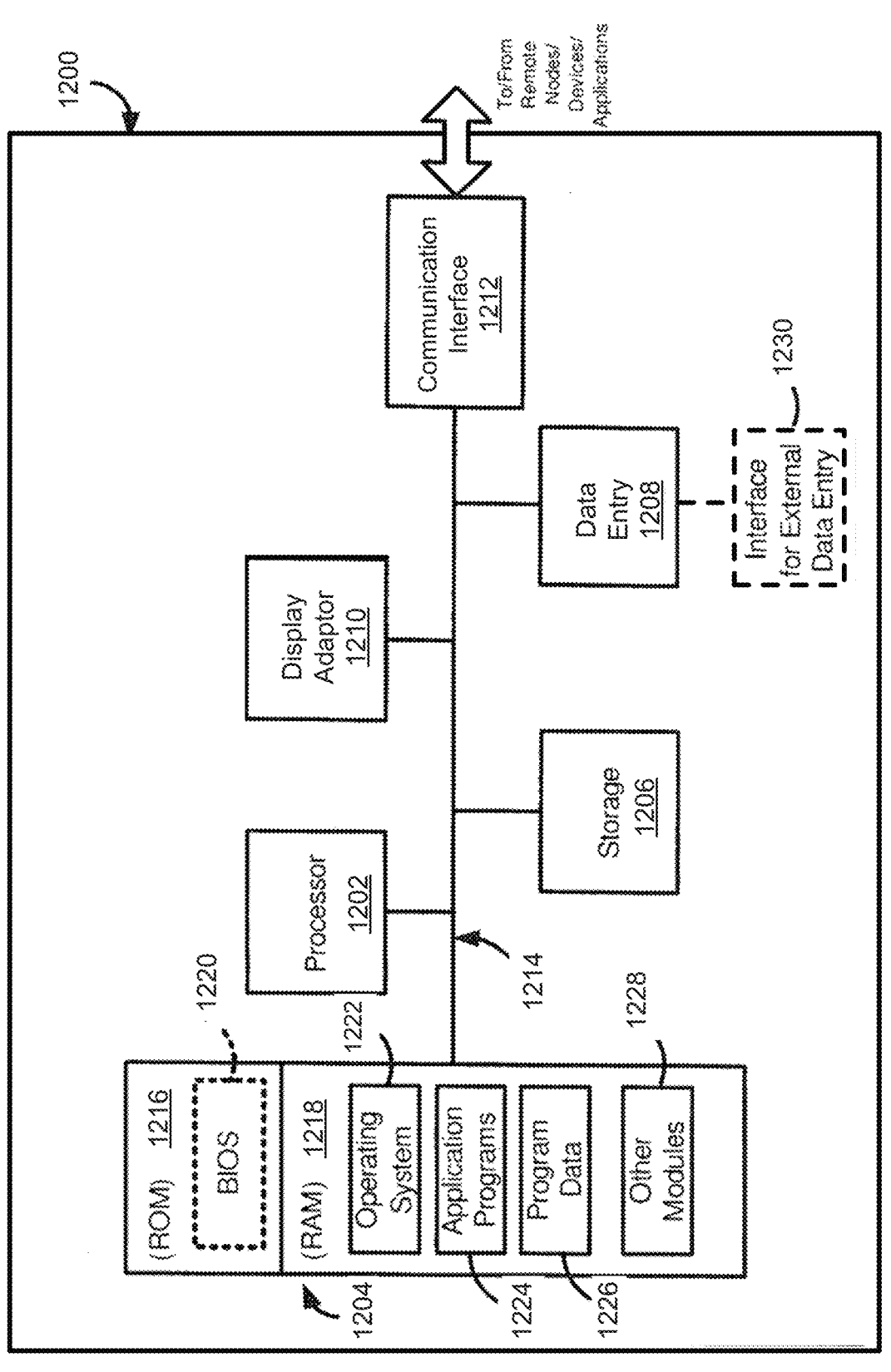
FIG. 12 is a block diagram of an exemplary system of providing feedback in response to a user-requested content conversion in accordance with various embodiments of the present invention.

FIG. 12 is a block diagram of an exemplary system for transferring an asset on a side chain ledger to a main blockchain such that control of an address associated with a main blockchain may be proven without associating a participant identity with the address in accordance with various embodiments of the present invention. With reference to FIG. 12, an exemplary system for implementing the subject matter disclosed herein, including the methods described above, includes a hardware device 1200, including a processing unit 1202, memory 1204, storage 1206, data entry module 1208, display adapter 1210, communication interface 1212, and a bus 1214 that couples elements 1204-1212 to the processing unit 1202.

The bus 1214 may comprise any type of bus architecture. Examples include a memory bus, a peripheral bus, a local bus, etc. The processing unit 1202 is an instruction execution machine, apparatus, or device and may comprise a microprocessor, a digital signal processor, a graphics processing unit, an application specific integrated circuit (ASIC), a field programmable gate array (FPGA), etc. The processing unit 1202 may be configured to execute program instructions stored in memory 1204 and/or storage 1206 and/or received via data entry module 1208.

The memory 1204 may include read only memory (ROM) 1216 and random access memory (RAM) 1218. Memory 1204 may be configured to store program instructions and data during operation of device 1200. In various embodiments, memory 1204 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1204 may also include nonvolatile memory technologies such as nonvolatile flash RAM (NVRAM) or ROM. In some embodiments, it is contemplated that memory 1204 may include a combination of technologies such as the foregoing, as well as other technologies not specifically mentioned. When the subject matter is implemented in a computer system, a basic input/output system (BIOS) 1220, containing the basic routines that help to transfer information between elements within the computer system, such as during start-up, is stored in ROM 1216.

The storage 1206 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1200.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment.

As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1206, ROM 1216 or RAM 1218, including an operating system 1222, one or more applications programs 1224, program data 1226, and other program modules 1228. A user may enter commands and information into the hardware device 1200 through data entry module 1208. Data entry module 1208 may include mechanisms such as a keyboard, a touch screen, a pointing device, etc. Other external input devices (not shown) are connected to the hardware device 1200 via external data entry interface 1230. By way of example and not limitation, external input devices may include a microphone, joystick, game pad, satellite dish, scanner, or the like. In some embodiments, external input devices may include video or audio input devices such as a video camera, a still camera, etc. Data entry module 1208 may be configured to receive input from one or more users of device 1200 and to deliver such input to processing unit 1202 and/or memory 1204 via bus 1214.

The hardware device 1200 may operate in a networked environment using logical connections to one or more remote nodes (not shown) via communication interface

1212. The remote node may be another computer, a server, a router, a peer device or other common network node, and typically includes many or all of the elements described above relative to the hardware device 1200. The communication interface 1212 may interface with a wireless network and/or a wired network. Examples of wireless networks include, for example, a BLUETOOTH network, a wireless personal area network, a wireless 802.12 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprisewide computer networks and the like. In some embodiments, communication interface 1212 may include logic configured to support direct memory access (DMA) transfers between memory 1204 and other devices.

In a networked environment, program modules depicted relative to the hardware device 1200, or portions thereof, may be stored in a remote storage device, such as, for example, on a server. It will be appreciated that other hardware and/or software to establish a communications link between the hardware device 1200 and other devices may be used.

It should be understood that the arrangement of hardware device 1200 illustrated in FIG. 12 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1200.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 12.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

The subject matter has been described herein with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description herein, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of a preferred embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method for converting input content, the method comprising:

converting the input content to output content using a generator neural network, wherein the input content comprises audio or visual digital media content, wherein the conversion comprises a transformation of the input content to produce the output content having one or more particular properties, wherein each of the one or more particular properties is representable as a feature value;

determining a difference between the output content and ground truth content having the one or more particular properties using a discriminative value neural network, wherein the difference comprises a determined difference in feature values between the output content and the ground truth content for the one or more particular properties, and wherein the difference corresponds to a success of the conversion applying the one or more particular properties;

generating control data using a third neural network using the difference from the discriminative value neural network, the third neural network comprising an encoder-decoder structure that is separate and distinct from the generator neural network and the discriminative value neural network, the encoder-decoder structure comprising one or more long short-term memory (LSTM) modules;

training the generator neural network to reduce the difference using the control data generated by the third neural network;

determining at least one of a plurality of actions in response to the difference, the at least one determined action comprising generating a message and presenting the message to a user; and performing the at least one determined action;

wherein the difference from the discriminative value neural network is output from a last hidden layer of the discriminative value neural network;

wherein the at least one determined action further includes converting hidden values in the last hidden layer of the discriminative value neural network into an interpretable indication for presentation to the user; and wherein:

the input content comprises a digital camera image; and the output content comprises an image containing image content of the digital camera image that is at least one of (i) transformed to a different image style or (ii) at a higher resolution than the digital camera image.

2. The method of claim 1, wherein:

the generator neural network uses the control data to reduce the difference by repeating the converting of the input content using the control data to generate updated output content, and the method further comprises repeating the determining of the difference using the updated output content.

3. The method of claim 2, wherein the updated output content includes the one or more particular properties.

4. The method of claim 1, wherein the at least one determined action is determined further based on resource limitations.

5. A system for converting input content, the system comprising:

one or more processors; and a non-transitory computer readable medium storing instructions that, when executed, cause the one or more processors to:

convert, by a generator neural network, the input content to output content, wherein the input content comprises audio or visual digital media content, wherein the conversion comprises a transformation of the input content to produce the output content having one or more particular properties, wherein each of the one or more particular properties is representable as a feature value;

determine, by a discriminative value neural network, a difference between the output content and ground truth content having the one or more particular properties, wherein the difference comprises a determined difference in feature values between the output content and the ground truth content for the one or more particular properties, and wherein the difference corresponds to a success of the conversion applying the one or more particular properties;

generate, by a third neural network, control data using the difference from the discriminative value neural network, the third neural network comprising an encoder-decoder structure that is separate and distinct from the generator neural network and the discriminative value neural network, the encoder-decoder structure comprising one or more long short-term memory (LSTM) modules;

train the generator neural network to reduce the difference using the control data generated by the third neural network;

determine at least one of a plurality of actions in response to the difference, the at least one determined action comprising generating a message and presenting the message to a user; and perform the at least one determined action;

wherein the difference from the discriminative value neural network is output from a last hidden layer of the discriminative value neural network; and wherein the at least one determined action further includes converting hidden values in the last hidden layer of the discriminative value neural network into an interpretable indication for presentation to the user; and wherein:

the input content comprises a digital camera image; and the output content comprises an image containing image content of the digital camera image that is at least one of (i) transformed to a different image style or (ii) at a higher resolution than the digital camera image.

6. The system of claim 5, wherein:

the generator neural network is configured to use the control data to reduce the difference by repeating the conversion of the input content using the control data to generate updated output content, and the instructions when executed further cause the one or more processors to repeat the determination of the difference using the updated output content.

7. The system of claim 5, wherein the discriminative value neural network is trained using a plurality of compatible pairs and a plurality of incompatible pairs.

8. The system of claim 5, wherein the instructions when executed cause the one or more processors to determine the at least one determined action further based on resource limitations.

9. The system of claim 6, wherein the updated output content includes the one or more particular properties.

10. The method of claim 1, further comprising:

training the discriminative value neural network using a plurality of compatible pairs and a plurality of incompatible pairs.

11. A non-transitory machine-readable medium containing instructions that when executed cause at least one processor of an electronic device to:

convert, by a generator neural network, input content to output content, wherein the input content comprises audio or visual digital media content, wherein the conversion comprises a transformation of the input content to produce the output content having one or more particular properties, wherein each of the one or more particular properties is representable as a feature value;

determine, by a discriminative value neural network, a difference between the output content and ground truth content having the one or more particular properties, wherein the difference comprises a determined difference in feature values between the output content and the ground truth content for the one or more particular properties, and wherein the difference corresponds to a success of the conversion applying the one or more particular properties;

generate, by a third neural network, control data using the difference from the discriminative value neural network, the third neural network comprising an encoder-decoder structure that is separate and distinct from the generator neural network and the discriminative value neural network, the encoder-decoder structure comprising one or more long short-term memory (LSTM) modules;

train the generator neural network to reduce the difference using the control data generated by the third neural network;

determine at least one of a plurality of actions in response to the difference, the at least one determined action comprising generating a message and presenting the message to a user; and perform the at least one determined action;

wherein the difference from the discriminative value neural network is output from a last hidden layer of the discriminative value neural network; and wherein the at least one determined action further includes converting hidden values in the last hidden layer of the discriminative value neural network into an interpretable indication for presentation to the user; and wherein:

the input content comprises a digital camera image; and the output content comprises an image containing image content of the digital camera image that is at least one of (i) transformed to a different image style or (ii) at a higher resolution than the digital camera image.

12. The non-transitory machine-readable medium of claim 11, wherein:

the generator neural network is configured to use the control data to reduce the difference by repeating the conversion of the input content using the control data to generate updated output content, and the instructions when executed further cause the at least one processor to repeat the determination of the difference using the updated output content.

13. The non-transitory machine-readable medium of claim 11, wherein the discriminative value neural network is trained using a plurality of compatible pairs and a plurality of incompatible pairs.

14. The non-transitory machine-readable medium of claim 11, wherein the instructions when executed cause the at least one processor to determine the at least one determined action further based on resource limitations.

15. The method of claim 1, wherein:

the control data is set to an initial value before a first iteration of the training of the generator neural network; and a value of the control data is updated by the third neural network during subsequent iterations of the training of the generator neural network.

16. The method of claim 1, wherein:

the input content comprises the digital camera image at a first resolution;

the output content comprises the image content at a second resolution; and the second resolution is greater than the first resolution.

17. The method of claim 1, wherein:

the input content comprises the digital camera image; and the output content comprises the image containing image content of the digital camera image transferred to the different image style.

18. The system of claim 5, wherein:

the input content comprises the digital camera image at a first resolution;

the output content comprises the image content at a second resolution; and the second resolution is greater than the first resolution.

19. The system of claim 5, wherein:

the input content comprises the digital camera image; and the output content comprises the image containing image content of the digital camera image transferred to the different image style.

20. The non-transitory machine-readable medium of claim 11, wherein:

the input content comprises the digital camera image at a first resolution;

the output content comprises the image content at a second resolution; and the second resolution is greater than the first resolution.

21. The non-transitory machine-readable medium of claim 11, wherein:

the input content comprises the digital camera image; and the output content comprises the image containing image content of the digital camera image transferred to the different image style.

\* \* \* \* \*